(12) United States Patent
Maguire et al.

(10) Patent No.: US 11,198,547 B2
(45) Date of Patent: Dec. 14, 2021

(54) CLOSURE WITH MEANS FOR INTRODUCING TWO ADDITIVES INTO A BEVERAGE CONTAINER

(71) Applicant: Gizmo Packaging Limited, Glasgow (GB)

(72) Inventors: Jordan Maguire, Glasgow (GB); Bernard Derek Frutin, Glasgow (GB)

(73) Assignee: Gizmo Packaging Limited, Glasgow (GB)

( * ) Notice: Subject to any disclaimer, the term of this patent is extended or adjusted under 35 U.S.C. 154(b) by 244 days.

(21) Appl. No.: 16/466,557

(22) PCT Filed: Dec. 11, 2017

(86) PCT No.: PCT/GB2017/053703
§ 371 (c)(1),
(2) Date: Jun. 4, 2019

(87) PCT Pub. No.: WO2018/109446
PCT Pub. Date: Jun. 21, 2018

(65) Prior Publication Data
US 2019/0291931 A1 Sep. 26, 2019

(30) Foreign Application Priority Data
Dec. 12, 2016 (GB) ..................... 1621054

(51) Int. Cl.
*B65D 51/28* (2006.01)
*A23L 2/52* (2006.01)
(Continued)

(52) U.S. Cl.
CPC ............ *B65D 51/2864* (2013.01); *A23L 2/52* (2013.01); *B65D 41/34* (2013.01);
(Continued)

(58) Field of Classification Search
CPC ...... B65D 51/00–2864; B65D 51/2892; B65D 41/00–34; B65D 81/00–32;
(Continued)

(56) References Cited

U.S. PATENT DOCUMENTS 2,275,567 A * 3/1942 Smith ................ B65D 51/2871
604/416
2,524,607 A * 10/1950 Smith ................ B65D 51/2871
206/221
(Continued)

FOREIGN PATENT DOCUMENTS

FR 712390 A 10/1931
GB 1124210 A 8/1968
(Continued)

OTHER PUBLICATIONS

UK Search Report for GB1621054.4 dated Jan. 19, 2018, 4 pages.
International Search Report and Written Opinion for PCT/GB2017/053703, dated Feb. 23, 2018, 10 pages.

*Primary Examiner* — Kareen K Thomas
(74) *Attorney, Agent, or Firm* — Faegre Drinker Biddle & Reath LLP

(57) ABSTRACT

A closure device for use with a container having a container neck comprises a cap member having a first fluid chamber and a housing having a second fluid chamber. The housing is arranged to move relative to the cap member between a first armed position and a second firing position. The housing includes a first plug member adapted to close a bottom aperture in the first fluid chamber in the first armed position. The cap member includes a second plug member adapted to close a bottom aperture in the second fluid chamber in the first armed position. In the second firing position the first plug member is removed from the aperture in the first fluid (Continued)

chamber and the second plug member is removed from the aperture in the second fluid chamber.

17 Claims, 4 Drawing Sheets

(51) Int. Cl.
*B65D 41/34* (2006.01)
*B65D 81/32* (2006.01)
*B65D 47/12* (2006.01)
(52) U.S. Cl.
CPC ......... *B65D 41/3447* (2013.01); *B65D 47/12* (2013.01); *B65D 51/28* (2013.01); *B65D 51/2892* (2013.01); *B65D 81/32* (2013.01); *B65D 81/3222* (2013.01); *A23V 2002/00* (2013.01); *B65D 2401/15* (2020.05)
(58) Field of Classification Search
CPC .... B65D 47/12; B65D 51/28; B65D 41/3447; B65D 81/3222; B65D 2401/15; A23L 2/00–52; A23V 2002/00
See application file for complete search history.

(56) References Cited

U.S. PATENT DOCUMENTS

| | | | | |
|---|---|---|---|---|
| 2,659,370 | A * | 11/1953 | Smith | B65D 51/2814 604/416 |
| 3,330,282 | A * | 7/1967 | Visser | A61J 1/2089 604/90 |
| 6,843,368 | B1 * | 1/2005 | Frutin | B65D 51/2857 206/219 |
| 7,588,142 | B1 * | 9/2009 | Bush | B65D 51/2857 206/221 |
| 8,328,010 | B2 * | 12/2012 | Lee | B65D 51/2864 206/221 |
| 8,336,706 | B2 * | 12/2012 | Lee | B65D 25/08 206/221 |
| 8,413,802 | B2 * | 4/2013 | Lee | B65D 81/3222 206/221 |
| 8,485,353 | B2 * | 7/2013 | Lee | B65D 47/243 206/221 |
| 8,490,786 | B2 * | 7/2013 | Rohr | B65D 51/2864 206/221 |
| 8,613,372 | B2 * | 12/2013 | Porter | B65D 51/2821 220/521 |
| 8,844,715 | B2 * | 9/2014 | Lee | B65D 47/243 206/219 |
| 9,045,269 | B2 * | 6/2015 | Frutin | B65B 69/00 |
| 2014/0166510 | A1 * | 6/2014 | Frutin | B65D 83/00 206/221 |
| 2015/0034673 | A1 * | 2/2015 | Hopkins | B65D 47/243 222/129 |
| 2015/0210458 | A1 * | 7/2015 | Ziegenfelder | B65D 33/14 220/495.06 |
| 2015/0217914 | A1 * | 8/2015 | Burgess | B65D 51/2835 220/521 |

FOREIGN PATENT DOCUMENTS

| | | |
|---|---|---|
| KR | 20090105772 A | 10/2009 |
| KR | 20100082691 A | 7/2010 |
| WO | 2005091730 A2 | 10/2005 |
| WO | 2006111803 A2 | 10/2006 |
| WO | 2007129116 A1 | 11/2007 |
| WO | 2015064973 A1 | 5/2015 |
| WO | 2015169822 A1 | 11/2015 |
| WO | 2017207962 A1 | 12/2017 |

* cited by examiner

CLOSURE WITH MEANS FOR INTRODUCING TWO ADDITIVES INTO A BEVERAGE CONTAINER

FIELD OF THE INVENTION

The present invention relates to a closure device, for use with a container such as a beverage container, which can fire under pressure two separate additive fluids or liquids into a liquid in the container by operation of the closure device. The invention also relates to a container including such a closure device and to a method of introducing two separate additive fluids or liquids by means of operating such a closure device.

BACKGROUND

In a number of applications, such as mixtures of different liquids, it may be necessary to release and mix an additive liquid into another liquid shortly before the liquid mixture is used. It may not be possible or desirable to store the liquids in a premixed form, as they may react undesirably with each other when stored as the mixture for a period of time. An example of this may be two component pharmaceuticals which have a longer shelf life when unmixed than they do when mixed. However, it can also apply to other liquids or to mixtures of liquids and gases, such as water, alcoholic beverages, other beverages, and other solvents or solutions. The term "beverage" when used in this specification includes any liquid, whether or not provided for drinking purposes, which may be mixed with an additive liquid, and is not limited to potable beverages.

A closure device for use with a beverage container which can release an additive liquid into the beverage by operation of the closure device is known from the prior art. International Patent Application WO2007/129116 discloses a closure device comprising a cap member defining a fluid chamber and a plug member which sealingly engages an aperture in the bottom of the fluid chamber. The cap member is raised relative to the plug member by unscrewing the cap member, from a closed position in which the plug member closes the bottom aperture to an open position in which the plug member is partially withdrawn from the bottom aperture to allow pressurised fluid to flow from the fluid chamber through a nozzle passage in the plug member to the beverage in the beverage container.

The known device has a single fluid chamber, so is not suitable for purposes where it is required to keep two additives in separate chambers prior to mixing.

SUMMARY OF THE INVENTION

It is an object of the present invention to overcome one or more disadvantages of the prior art.

According to a first aspect of the present invention there is provided a closure device for use with a container having a main liquid compartment and an opening with a container neck, the closure device comprising:
- a cap member comprising a first fluid chamber having a bottom aperture in the first fluid chamber,
- a housing arranged to move relative to the cap member between a first armed position of the closure device and a second firing position of the closure device,
- wherein the housing includes a second fluid chamber and a first plug member adapted to close the bottom aperture in the first fluid chamber in the first armed position of the closure device,
- wherein the cap member includes a second plug member adapted to close the bottom aperture in the second fluid chamber in the first armed position of the closure device,
- wherein the first plug member is at least partially removed from the bottom aperture in the first fluid chamber in the second firing position of the closure device, and
- wherein the second plug member is at least partially removed from the bottom aperture in the second fluid chamber in the second firing position of the closure device.

When the cap member is lifted relative to the housing, for example by rotation of a threaded connection, from the first armed position to the second firing position, the contents of the first fluid chamber can flow through the bottom aperture in the first fluid chamber into the second fluid chamber, where it is mixed with the contents of the second fluid chamber. The mixed contents can then flow through the bottom aperture in the second fluid chamber into the main liquid compartment of the container. The first and second fluid chambers may be referred to as tanks. The closure device may be referred to as a twin tank closure device.

The housing may include a means for securing the housing to the container neck, such as a detent, cam surface or thread. The housing may include a side wall having an inner surface provided with an internal thread which is adapted to engage with an external thread provided on the container neck.

The cap member may comprise a side wall provided with means for lifting the cap member relative to the housing, such as a cam surface or thread. The side wall of the cap member may include an internal thread provided on its inner surface and adapted to engage with an external thread provided on the outer surface of the side wall of the housing.

In the first armed position the cap member may be engaged with the housing by means of a detachable member. The detachable member may be a tamper-proof band connected to the side wall of the cap member by a frangible web.

The first fluid chamber may be pressurised. The first fluid chamber may contain a liquid additive and a propellant.

The first fluid chamber may have a bottom wall and an annular channel provided on the lower surface of the bottom wall.

The second fluid chamber may contain a second additive. The second additive may be a liquid or a flowable solid, such as a powder or granulated solid.

The bottom aperture in the first fluid chamber may comprise a one or more orifices provided in the annular channel.

The first plug member may comprise a cylindrical wall portion adapted to sealingly engage with the annular channel.

The annular channel may have a plurality of orifices arranged to be sealed from the interior volume of the second fluid chamber when the annular channel is sealingly engaged with the first plug member in the first armed position of the closure device. The plurality of orifices may be in fluid communication with the interior volume of the second fluid chamber when the annular channel is separated from the first plug member in the second firing position of the closure device.

The cylindrical wall portion of the first plug member and the annular channel effectively form a plug and socket, which serve to seal the orifices when the closure device is in the closed armed position, but open all the orifices simultaneously when the first fluid chamber is raised relative to the first plug member and the closure device is in the firing position.

Preferably the orifices are arranged in an annular pattern.

The closure assembly has a plurality of orifices, so that an additive liquid can be ejected in a "shower head" pattern into the second fluid chamber, to improve distribution and mixing of the additive liquid with an additive provided in the second fluid chamber.

The second plug member may be provided on the lower surface of the bottom wall of the first fluid chamber.

The second plug member may extend through the second fluid chamber.

The second plug member may sealingly engage with the bottom aperture of the second fluid chamber when the closure device is in the first armed position. The bottom aperture may be provided in the bottom wall of the second fluid chamber. The second plug member may be an elongate cylindrical plug member, and the bottom aperture of the second fluid chamber may be substantially circular in cross section.

The second fluid chamber may comprise a cylindrical side wall which is formed integrally with the housing by moulding. The bottom wall of the second fluid chamber may be formed separately and sealingly secured by detent means to the cylindrical side wall.

The first plug member may include sealing means to provide a seal between the lateral external surface of the plug member and the walls of the annular channel.

The sealing means may be a coating of an elastomeric material, such as a soft plastic.

The second plug member may include sealing means to provide a seal between the lateral external surface of the plug member and the bottom aperture of the second fluid chamber. Alternatively the sealing means may be provided on the internal surface of the bottom aperture. The sealing means may be a coating of an elastomeric material, such as a soft plastic.

The cap member and first fluid chamber and second plug member may be formed as a single moulding. Alternatively first fluid chamber and second plug member may be formed as a separate moulded item and subsequently secured to the cap member by bonding, welding or other suitable means.

The side wall of the housing may be provided with an anti-tamper band to prevent removal of the closure device from the neck of a beverage container without prior removal of the anti-tamper band.

According to a second aspect of the present invention there is provided a container having a container neck and an opening, wherein the container contains a liquid, and wherein a closure device according to the first aspect of the present invention is secured to the container neck to close the container.

Preferably the side wall of the housing is secured to the container neck by means of internal threads provided on the side wall of the housing.

According to a third aspect of the present invention there is provided a method of introducing an additive liquid into a container, the method comprising:
  providing a closure device according to the fourth aspect of the invention with a liquid additive and a pressurised propellant inside the first fluid chamber and a second additive in the second fluid chamber,
  while the closure device is in the first armed position securing the closure device to the neck of a container containing a liquid,
  raising the cap member relative to the housing, thereby at least partially withdrawing the first plug member from the bottom aperture of first fluid chamber and the second plug member from the bottom aperture of the second fluid chamber,
  urging the additive liquid from the first fluid chamber into the second fluid chamber under pressure of the pressurised propellant in the first fluid chamber to mix with an additive provided in the second fluid chamber, and
  urging the additive liquid and second additive from the second fluid chamber into the container under pressure of the pressurised propellant in the second fluid chamber.

Preferably the method includes the step of mixing the additive liquid with liquid in the container.

The liquid in the container may be a beverage or a chemical or pharmaceutical composition. The liquid may be of any viscosity, for example a gel.

BRIEF DESCRIPTION OF THE DRAWINGS

The invention will be described, by way of example only, with reference to the drawings in which.

DESCRIPTION OF SPECIFIC EMBODIMENTS

Figure 1:
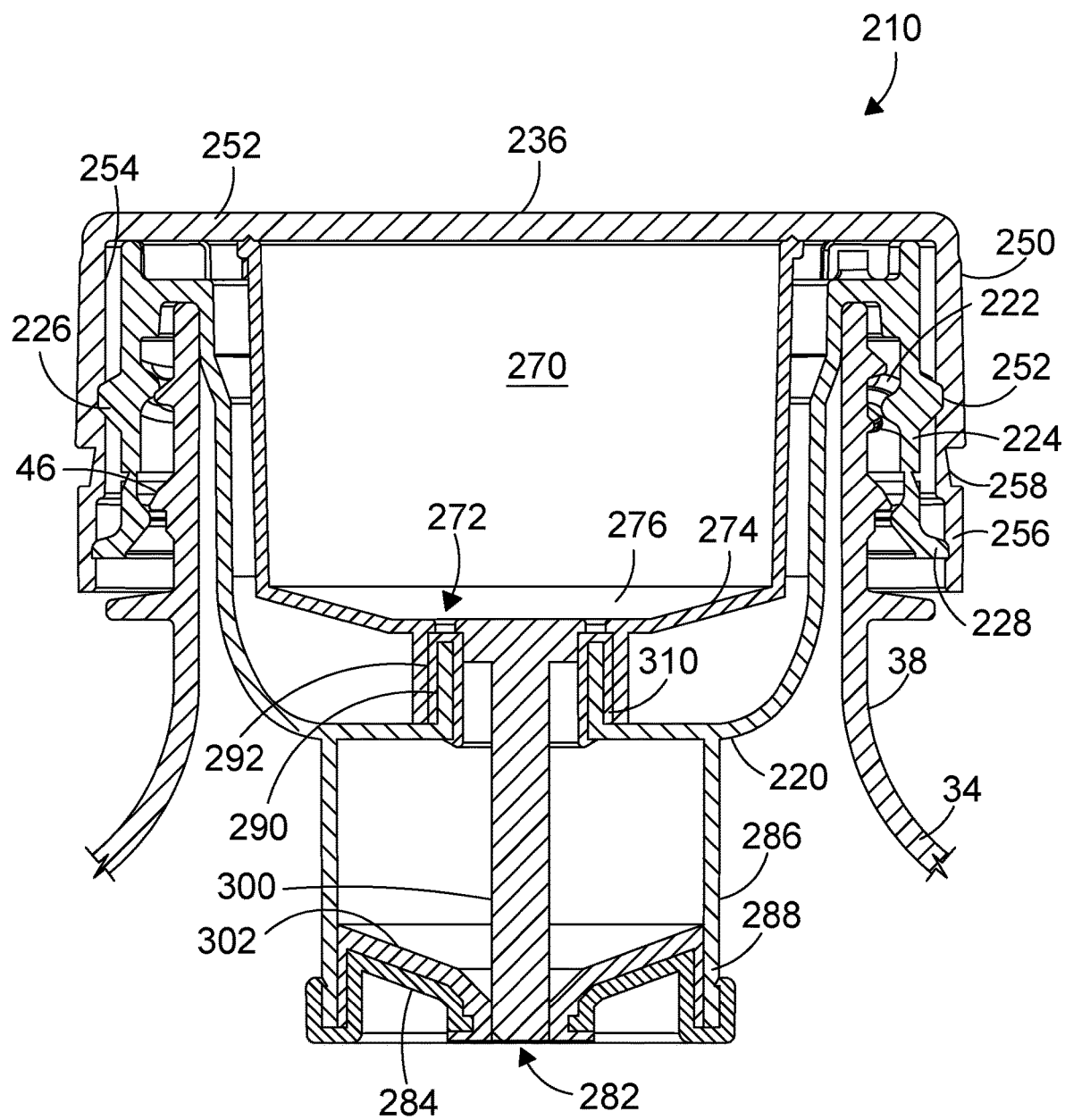
FIG. 1 shows a schematic cross-sectional view of a closure device according to another embodiment of the present invention in a first armed position.
Figure 2:
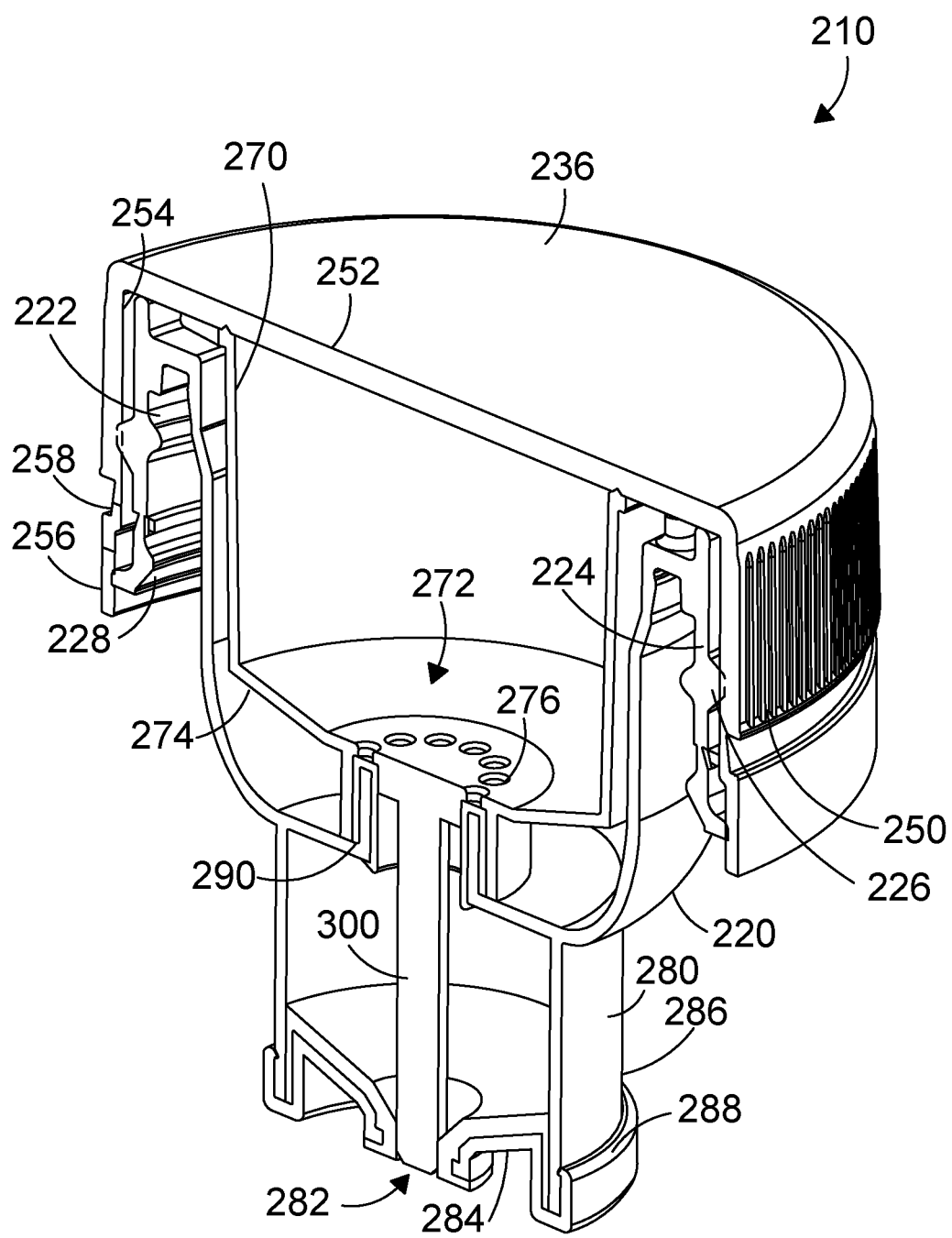
FIG. 2 shows a perspective cross-sectional view of the closure device of FIG. 1.

With reference to FIGS. 1 and 2 there is shown a closure device 210 in a first closed position. The closure device 210 is shown fitted to the neck 38 of a container 34. The container 34 contains a fluid in a main liquid compartment (not shown). The container 34 may be, for example, a PET bottle. The container 34 may hold a variety of liquids such as water, or a pharmaceutical or glucose solution. The liquid may be for consumption, but may instead be a chemical composition for other use, such as cleaning, healthcare, hair dye application, painting or household maintenance. However, for the purposes of this description, the liquid held in the container 34 will hereinafter be referred to as the beverage.

Figure 3:
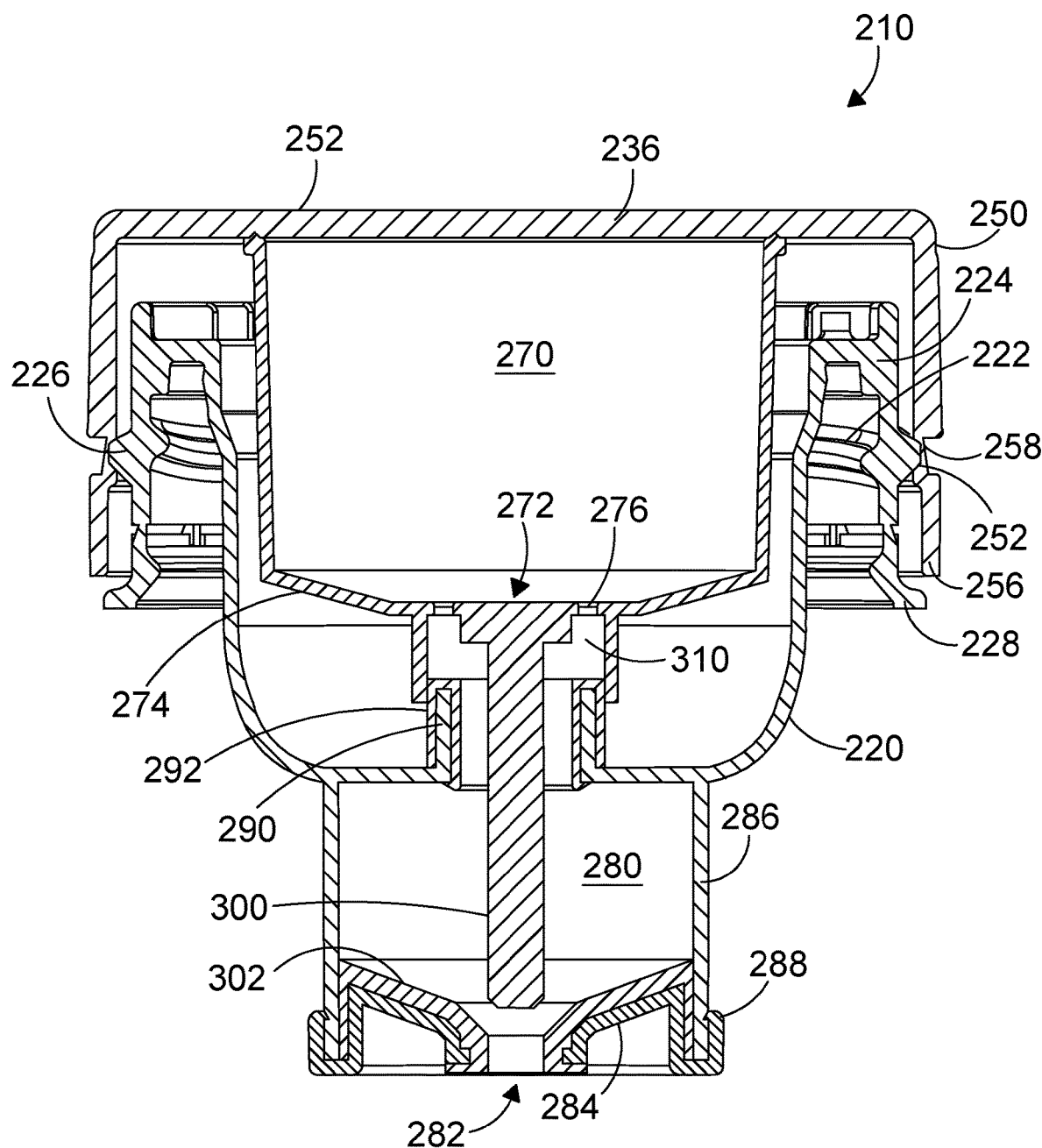
FIG. 3 shows a schematic cross-sectional view of a closure device according to another embodiment of the present invention in a first armed position.
Figure 4:
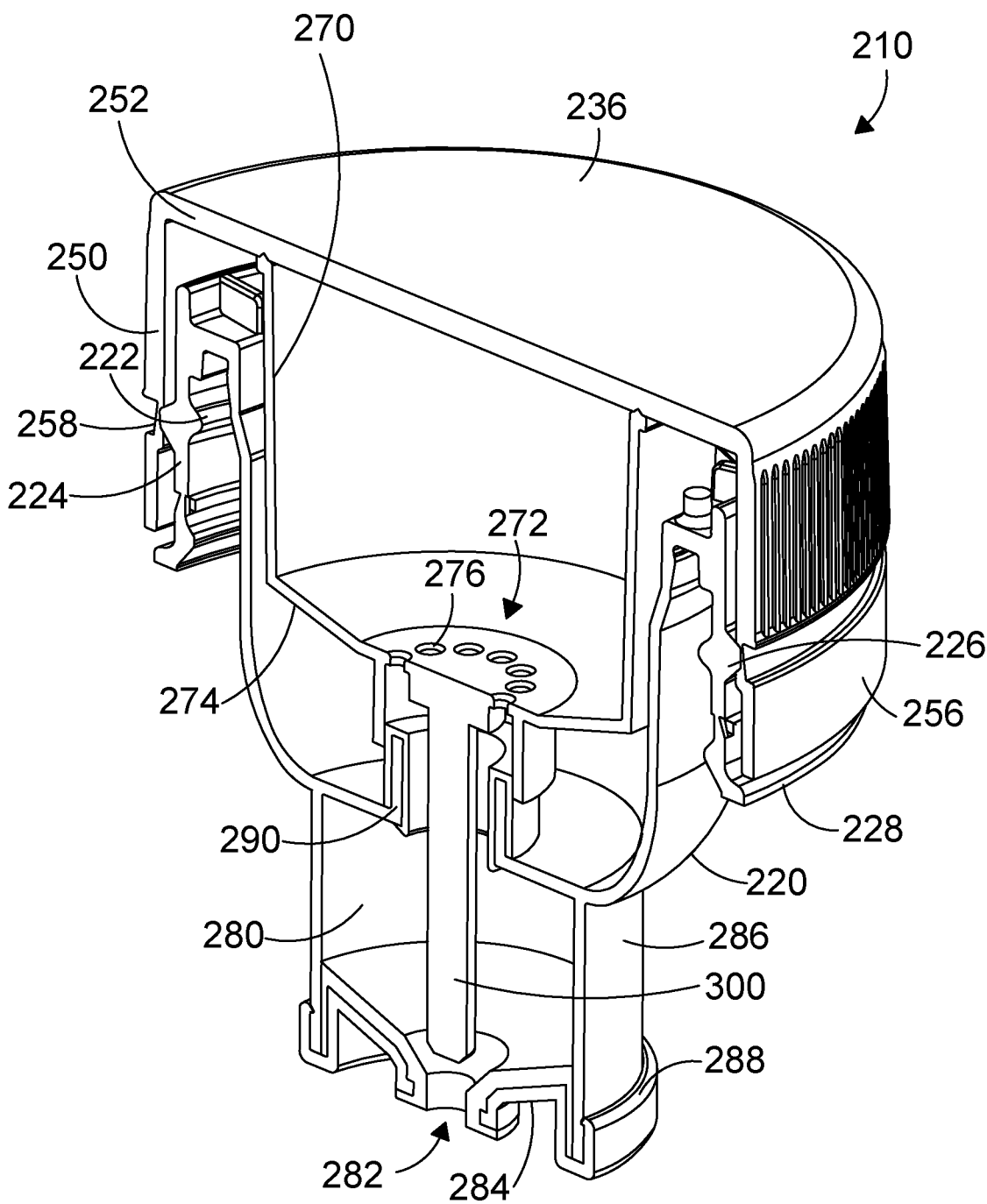
FIG. 4 shows a perspective cross-sectional view of the closure device of FIG. 3.

The neck 38 and container 34 are illustrated in FIG. 1, but are omitted in FIGS. 2 to 4 for clarity.

The closure device 210 includes a cap member 236 comprising a first fluid chamber 270 having a bottom aperture 272 in its bottom wall 274, which in the illustrated example comprises a annular array of orifices 276, but can include one or more orifices arranged in any pattern in the first fluid chamber 270.

The cap member 236 can be integrally moulded with the first fluid chamber 270, or the fluid chamber 270 can be moulded separately and fixed to the top wall 252 of the cap member 236, by bonding, welding or any suitable method.

The closure device 210 also includes a housing 220 arranged to move relative to the cap member 236 between a first armed position of the closure device, shown in FIGS. 1 and 2, and a second firing position of the closure device, shown in FIGS. 3 and 4. The housing 220 includes a second fluid chamber 280 and a first plug member 290 adapted to close the bottom aperture 272 in the first fluid chamber in the first armed position of the closure device.

The housing 220 is attached to the neck 34 by means of a threaded arrangement. The threaded arrangement comprises an external thread 46 located on an outer surface of the container neck 38 that engages with an internal thread 222 located on an inner surface of a side wall 224 of the housing 220.

The cap member 236 includes a second plug member 300 adapted to close a bottom aperture 282 provided in the bottom of the second fluid chamber 280 in the first armed position of the closure device. The second plug member 300 projects downwards from the bottom wall 274 of the first fluid chamber 270. It has a circular cross-sectional shape so that it can plug and seal the second bottom aperture 282, even as the cap member 236 is rotated relative to the housing 220. The second plug member 300 is located inside the annular arrangement of orifices 276.

When the cap member 236 is raised relative to the housing 220, so that closure device 210 is moved to the second firing position illustrated in FIGS. 3 and 4, the first plug member 290 is at least partially removed from the bottom aperture 272 in the first fluid chamber 270, and at the same time the second plug member 300 is at least partially removed from the bottom aperture 282 in the second fluid chamber 280.

The cap member 236 comprises a side wall 250 provided with means for lifting the cap member 236 relative to the housing 220, such as a cam surface or thread. The side wall 250 of the cap member may include an internal thread 252 provided on its inner surface 254 and adapted to engage with an external thread 226 provided on the outer surface of the side wall 224 of the housing 220.

In the illustrated example, the cap member 236 is lifted relative to the housing 220 by rotation of the threaded connection 252, 226 from the first armed position to the second firing position. In the firing position, the contents of the first fluid chamber 270 can flow through the bottom aperture 272 in the first fluid chamber 270 into the second fluid chamber 280, where it is mixed with the contents of the second fluid chamber 280. The mixed contents can then flow through the bottom aperture 282 in the second fluid chamber 280 into the main liquid compartment of the container 34. However other means for raising the cap member 236 relative to the housing 220 may be provided instead. The housing 220 may include a means for securing the housing to the container neck 38, such as a detent, cam surface or thread.

In the first armed position the cap member 236 may be engaged with the housing 220 by means of a detachable member 256. The detachable member may be a tamper-proof band 256 connected to the side wall 250 of the cap member by a frangible web 258.

The first fluid chamber 270 is pressurised and contains a liquid additive and a propellant.

The second fluid chamber 280 contains a second additive, for example an additive which must be stored separately from the first additive. The second additive may be a liquid or a flowable solid, such as a powder or granulated solid.

An annular channel 310 is provided on the lower surface of the bottom wall 274 of the first fluid chamber 270. The orifices 276 of the first aperture 274 are provided in the annular channel 310. The first plug member 290 comprises a cylindrical wall portion 292 adapted to sealingly engage with the annular channel 310. The orifices 276 are sealed from the interior volume of the second fluid chamber 280 when the annular channel 310 is sealingly engaged with the first plug member 290 in the first armed position of the closure device 210. The orifices 276 are in fluid communication with the interior volume of the second fluid chamber 280 when the annular channel 310 is separated from the first plug member 290 in the second firing position of the closure device 210.

The cylindrical wall portion 292 of the first plug member 290 and the annular channel 310 effectively form a plug and socket, which serve to seal the orifices 276 when the closure device 210 is in the closed armed position, but open all the orifices 276 simultaneously when the first fluid chamber 270 is raised relative to the first plug member 290 and the closure device 210 is in the firing position. The additive liquid is ejected in a "shower head" pattern through the orifices 276 into the second fluid chamber 280, to improve distribution and mixing of the additive liquid with the additive provided in the second fluid chamber 280.

The second plug member 300 extends through the second fluid chamber 280 and sealingly engages with the bottom aperture 282 in the bottom wall 284 of the second fluid chamber 280 when the closure device 210 is in the first armed position.

In the illustrated example the second fluid chamber 280 has cylindrical side wall 286 which is formed integrally with the housing 220 by moulding. The bottom wall 284 of the second fluid chamber 280 may be formed separately, and can be permanently and sealingly secured to the cylindrical side wall 286 by a non-returnable detent means 288.

The first plug member 290 includes a sealing means 292 to provide a seal between the lateral external surface of the plug member 290 and the walls of the annular channel 310. The sealing means 292 may be a coating of an elastomeric material, such as a soft plastic, or a separate sealing washer or the like.

The second plug member 300 includes a sealing means 302 to provide a seal between the lateral external surface of the plug member 300 and the bottom aperture 282 of the second fluid chamber 280. Alternatively the sealing means 302 may be provided on the internal surface of the bottom aperture 280. In both cases, the sealing means 302 may be a coating of an elastomeric material, such as a soft plastic, or a separate sealing washer or the like.

The cap member 236 and first fluid chamber 270 and second plug member 300 may be formed as a single moulding. Alternatively first fluid chamber 270 and second plug member 300 may be formed as a separate moulded item and subsequently secured to the cap member 236 by bonding, welding or other suitable means.

The side wall 224 of the housing 220 may be provided with an anti-tamper band 228 to prevent removal of the closure device 210 from the neck of a beverage container without prior removal of the anti-tamper band 228. In the illustrated example the anti-tamper band 228 is covered by the side wall 250 of the cap member 236 in the closed or armed position, providing an additional level of security.

The closure device 210 of the invention provides an effective and economical way of storing two additive components separately and introducing and mixing them in the beverage automatically at the time of opening the container. The closure device can be filled and provided separately for securing to a bottle at the place of filing the bottle. The second fluid chamber 280 is not pressurised in the armed position, but in the firing position the propellant enters the second chamber and serves to mix the first and second additives. The second additive can be a powder or a liquid. The second plug member 300 is dimensioned such that the second aperture preferably opens at the same time or just before the first aperture, so that the second fluid chamber 280 does not remain pressurised.

The invention is not limited to the specific embodiments described, and modifications and alternatives are possible. The shape, material and size of the various components can be modified. In particular the shape and size of the first and second plug members may be varied, as can the shape and size of the fluid chambers.

The invention claimed is:

1. A closure device for use with a container having a main liquid compartment and an opening with a container neck, the closure device comprising:
 a cap member comprising a first fluid chamber having a bottom aperture in the first fluid chamber,
 a housing arranged to move relative to the cap member between a first armed position of the closure device and a second firing position of the closure device,
 wherein the housing includes a second fluid chamber and a first plug member adapted to close the bottom aperture in the first fluid chamber in the first armed position of the closure device,
 wherein the cap member includes a second plug member adapted to close the bottom aperture in the second fluid chamber in the first armed position of the closure device,
 wherein the first plug member is at least partially removed from the bottom aperture in the first fluid chamber in the second firing position of the closure device, and
 wherein the second plug member is at least partially removed from the bottom aperture in the second fluid chamber in the second firing position of the closure device.

2. The closure device of claim 1, wherein the housing includes a side wall having an inner surface provided with an internal thread which is adapted to engage with an external thread provided on the container neck.

3. The closure device of claim 2, wherein the cap member comprises a side wall having an internal thread provided on its inner surface and adapted to engage with an external thread provided on the outer surface of the side wall of the housing.

4. The closure device of claim 1, wherein in the first armed position the cap member is engaged with the housing by means of a detachable member.

5. The closure device of claim 1, wherein the first fluid chamber is pressurised and contains a liquid additive and a propellant, and the second fluid chamber contains a second additive.

6. The closure device of claim 1, wherein the first fluid chamber has a bottom wall and an annular channel provided on a lower surface of the bottom wall, and wherein the bottom aperture in the first fluid chamber comprises one or more orifices provided in the annular channel.

7. The closure device of claim 6, wherein the first plug member comprises a cylindrical wall portion adapted to sealingly engage with the annular channel.

8. The closure device of claim 6, wherein the second plug member is provided on a lower surface of the bottom wall of the first fluid chamber and extends through the second fluid chamber.

9. The closure device of claim 8, wherein the second plug member sealingly engages with the bottom aperture of the second fluid chamber when the closure device is in the first armed position, the bottom aperture being provided in the bottom wall of the second fluid chamber.

10. The closure device of claim 1, wherein the second fluid chamber comprises a cylindrical side wall which is formed integrally with the housing by moulding.

11. The closure device of claim 6, wherein the annular channel includes walls, and wherein the first plug member includes sealing means to provide a seal between a lateral external surface of the first plug member and the walls of the annular channel.

12. The closure device of claim 1, wherein one of the second plug member and an internal surface of the bottom aperture of the second fluid chamber is provided with sealing means to provide a seal between a lateral external surface of the second plug member and the bottom aperture of the second fluid chamber.

13. A combination of a container and a closure device comprising
 the container having a main liquid compartment, a container neck and an opening, wherein the container contains a liquid, and
 wherein the closure device is secured to the container neck to close the container, the closure device comprising
 a cap member comprising a first fluid chamber having a bottom aperture in the first fluid chamber,
 a housing arranged to move relative to the cap member between a first armed position of the closure device and a second firing position of the closure device,
 wherein the housing includes a second fluid chamber and a first plug member adapted to close the bottom aperture in the first fluid chamber in the first armed position of the closure device,
 wherein the cap member includes a second plug member adapted to close the bottom aperture in the second fluid chamber in the first armed position of the closure device,
 wherein the first plug member is at least partially removed from the bottom aperture in the first fluid chamber in the second firing position of the closure device, and
 wherein the second plug member is at least partially removed from the bottom aperture in the second fluid chamber in the second firing position of the closure device.

14. The container of claim 13, wherein the housing includes a side wall which is secured to the container neck by means of internal threads provided on the side wall of the housing.

15. A method of introducing an additive liquid into a container, the method comprising:
 providing a closure device for use with the container, the container having a main liquid compartment and an opening with a container neck, the closure device comprising:
 a cap member comprising a first fluid chamber having a bottom aperture in the first fluid chamber,
 a housing arranged to move relative to the cap member between a first armed position of the closure device and a second firing position of the closure device,
 wherein the housing includes a second fluid chamber and a first plug member adapted to close the bottom aperture in the first fluid chamber in the first armed position of the closure device,
 wherein the cap member includes a second plug member adapted to close the bottom aperture in the second fluid chamber in the first armed position of the closure device, wherein the first plug member is at least partially removed from the bottom aperture in the first fluid chamber in the second firing position of the closure device, and wherein the second plug member is at least partially removed from the bottom aperture in the second fluid chamber in the second firing position of the closure device, the closure device having a liquid additive and a pressurised propellant inside the first fluid chamber and a second additive in the second fluid chamber, while the closure device is in the first armed position securing the closure device to the neck of a container containing a liquid, raising the cap member relative to the housing, thereby at least partially withdrawing the first plug member from the bottom aperture of first fluid chamber and the second plug member from the bottom aperture of the second fluid chamber, urging the additive liquid from the first fluid chamber into the second fluid chamber under pressure of the pressurised propellant in the first fluid chamber to mix with an additive provided in the second fluid chamber, and urging the additive liquid and second additive from the second fluid chamber into the container under pressure of the pressurised propellant in the second fluid chamber.

16. The method of claim 15, including the step of mixing the additive liquid with liquid in the container.

17. The method of claim 15, wherein the liquid in the container is a beverage or a chemical or pharmaceutical composition.

\* \* \* \* \*